(No Model.)
C. C. & F. G. KEEN.
RUB IRON FOR VEHICLES.
No. 278,149. Patented May 22, 1883.
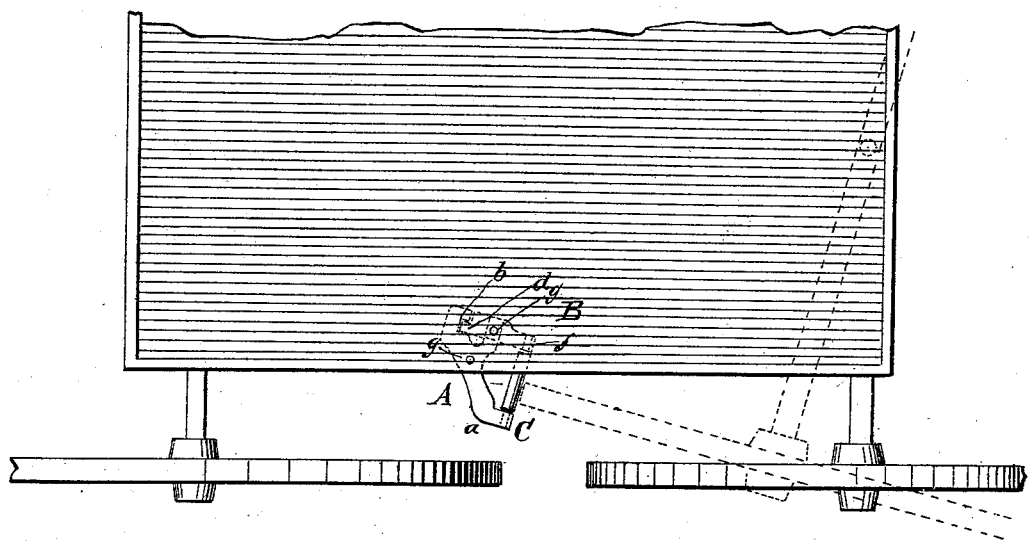
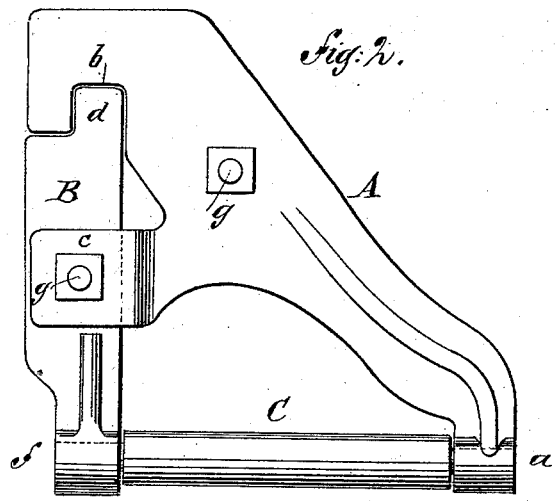 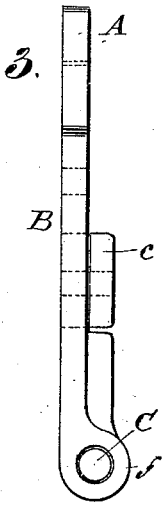
WITNESSES:
INVENTOR:
C. C. Keen
F. G. Keen
BY
ATTORNEYS.

UNITED STATES PATENT OFFICE.

CHARLES C. KEEN AND FRANK G. KEEN, OF NORTH McGREGOR, IOWA.

RUB-IRON FOR VEHICLES.

SPECIFICATION forming part of Letters Patent No. 278,149, dated May 22, 1883.

Application filed March 7, 1883. (No model.)

*To all whom it may concern:*

Be it known that we, CHARLES C. KEEN and FRANK G. KEEN, of North McGregor, in the county of Clayton and State of Iowa, have invented a new and Improved Rub-Iron for Vehicles, of which the following is a full, clear, and exact description.

Reference is to be had to the accompanying drawings, forming part of this specification, in which similar letters of reference indicate corresponding parts in all the figures.

Figure 1 is a plan view, showing our new and improved rub-iron attached to the box of a vehicle. Fig. 2 is a plan view of the under side of the rub-iron removed from the box of the vehicle, and Fig. 3 is an edge view of the same.

A represents the main casting of the device, which is formed with the bearing $a$ at its outer end, the notch $b$ at its inner end, and with the medial plate or support, $c$; and B represents a cast-iron or other suitable metal plate, which is formed with the projection $d$ at its rear end, that fits in the notch $b$ of the casting A, and with the bearing $f$ at its outer end; and C represents the wrought-iron or other suitable metal roller of the device, which is journaled in the bearings $a\,f$ of the castings A B, as shown in the drawings.

The device is adapted to be attached to the box of the vehicle, in proper position to protect the box from the forward wheels of the vehicle in turning the vehicle, as illustrated in Fig. 1, by the two bolts $g\,g$, which at the same time lock the castings A B together in such manner that they hold the roller C firmly in place, and so that it will always turn freely in its bearings $a\,f$.

Constructed in this manner it will be seen that the rub-iron is cheap and easily applied, will fully protect the vehicle-box, is easier upon the wheels and tires of the vehicle than the ordinary form of rub-irons, and that the roller C will facilitate the turning of the vehicle to which it is attached, and that it may be set at any position or angle desired to suit any form of box or size of wheels, and is adapted for both light and heavy vehicles.

Having thus described our invention, we claim as new and desire to secure by Letters Patent—

1. A bearing-plate for a rub-iron roll, consisting of two plates, A B, having, respectively, the notch and projection $b\,d$ and bearings $a\,f$, the former provided with an offset or arm, $c$, whereby said bearing-plate may be readily secured to the roll and to the vehicle, as described.

2. The casting A, having bearing $a$, notch $b$, and medial plate, $c$, in combination with roller C, plate B, having bearing $f$, and projection $d$, and the bolts $g\,g$, for securing the device to the box, as set forth.

CHARLES C. KEEN.
FRANK G. KEEN.

Witnesses:
M. T. KENNEDY,
J. P. BARNUM.